(12) United States Patent
Heider et al.

(10) Patent No.: US 7,996,127 B2
(45) Date of Patent: Aug. 9, 2011

(54) DISPLAY SYSTEM FOR A TRAILER VEHICLE

(75) Inventors: Joachim Heider, Peine (DE); Bernd Heise, Hannover (DE); Axel Stender, Hameln (DE); Norbert Witte, Lauenau (DE)

(73) Assignee: WABCO GmbH, Hannover (DE)

( * ) Notice: Subject to any disclaimer, the term of this patent is extended or adjusted under 35 U.S.C. 154(b) by 226 days.

(21) Appl. No.: 12/308,631

(22) PCT Filed: May 2, 2007

(86) PCT No.: PCT/EP2007/003859
§ 371 (c)(1),
(2), (4) Date: Dec. 18, 2008

(87) PCT Pub. No.: WO2007/147459
PCT Pub. Date: Dec. 27, 2007

(65) Prior Publication Data
US 2010/0070127 A1 Mar. 18, 2010

(30) Foreign Application Priority Data
Jun. 22, 2006 (DE) .................. 10 2006 028 584

(51) Int. Cl.
*G01C 22/02* (2006.01)
(52) U.S. Cl. ................. 701/30; 701/36; 701/71
(58) Field of Classification Search .......... None
See application file for complete search history.

(56) References Cited

U.S. PATENT DOCUMENTS

| | | | |
|---|---|---|---|
| 5,900,803 A | 5/1999 | Politz et al. | |
| 6,313,742 B1 | 11/2001 | Larson | |
| 7,227,455 B2 * | 6/2007 | Waszkowski | 340/441 |
| 2002/0149350 A1 * | 10/2002 | Koyasu | 323/274 |
| 2004/0083040 A1 | 4/2004 | Parrott et al. | |
| 2004/0113811 A1 | 6/2004 | Waszkowski | |

FOREIGN PATENT DOCUMENTS

| | | |
|---|---|---|
| DE | 100 18 942 A1 | 10/2001 |
| DE | 10 2005 013 028 A1 | 10/2006 |
| EP | 0 809 216 A2 | 11/1997 |
| GB | 2 117 516 A | 10/1983 |
| WO | WO 98/40256 | 9/1998 |
| WO | WO 99/44017 | 9/1999 |

OTHER PUBLICATIONS

Anonymous: "Infomaster für Anhängefahrzeuge 446 303..." Wabco Prospekt, [Online] Aug. 1998, pp. 1-2, XP002446211.

* cited by examiner

*Primary Examiner* — Thomas Black
*Assistant Examiner* — Sara Lewandroski
(74) *Attorney, Agent, or Firm* — Kramer Levin Naftalis & Frankel LLP

(57) ABSTRACT

A display system is provided for a trailer equipped with an electronic braking system (EBS) and/or an anti-lock braking system (ABS). A separate display device having a display is provided for indicating at least the mileage on the trailer vehicle. In order to reduce the amount of wiring required, a speed signal of at least one of the wheels of the trailer is looped through the EBS/ABS and is routed directly to the display device.

3 Claims, 2 Drawing Sheets

DISPLAY SYSTEM FOR A TRAILER VEHICLE

FIELD OF THE INVENTION

The present invention relates generally to a display system for a trailer vehicle.

BACKGROUND OF THE INVENTION

In commercial vehicle trailers, there is a need for a display system separate from the motor truck for certain data, such as the mileage and the condition of built-in electronics of the trailer. This is particularly important for the mileage of the trailer, since the trailer often travels behind different tractors, and, as a result, the mileages of the tractor and trailer generally do not agree. By recording the mileage of the trailer in such a way, it is possible, for example, to ascertain the maintenance intervals thereof more accurately.

Trailer systems of the general type under consideration are known. For example, WO 99/44017 describes an odometer for a trailer in which one wheel is equipped with its own wheel-speed sensor. For this purpose, a speed sensor of an anti-lock braking system (ABS) can also be used as the sensor. The signal of the sensor is fed via a cable to its own odometer evaluating electronics having a microcontroller and a display. The electronics contain a battery and a power-saving circuit.

Also, a display system for various data of a trailer is described in a brochure for trailer vehicles titled "Infomaster für Anhängefahrzeuge 446 303 . . . " WABCO PROSPEKT, [Online] Aug. 1998 (1998-08), pages 1-2, XP002446211. In this known system for a trailer equipped with an ABS, the speed signal of an ABS wheel-speed sensor of the trailer is passed to both the ABS electronics and a separate display unit. In most cases this display unit is mounted on the side of the rear part of the trailer such that it is visible from the outside. The distance signal for such a display unit is usually derived from the closest ABS wheel sensor. For this purpose, what is known as a Y cable is used, which branches to the ABS electronics and to the display unit. However, it is a complicated matter to lay such a cable, which is also costly to manufacture.

SUMMARY OF THE INVENTION

Generally speaking, in accordance with embodiments of the present invention, an improved display system is provided for a trailer equipped with an electronic braking system (EBS) and/or an ABS. A separate display device is provided for indicating at least the mileage of the trailer. To advantageously reduce the amount of wiring required, a speed signal of at least one of the trailer wheels is looped through the EBS/ABS and is routed directly to the display device.

Because the connecting cable of the wheel sensor leads first to the EBS/ABS electronics, instead of directly to the display unit as is the conventional case, the total length of the lines is longer than in the conventional design. Since the complex Y cable is eliminated, however, a cost savings is achieved that is significant for the mass-produced components in question.

It is, accordingly, an object of the present invention to provide a simple mile counter that can be installed without great cabling complexity.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

The invention will be explained in greater detail hereinafter on the basis of the accompanying drawings, wherein.

DETAILED DESCRIPTION OF THE PREFERRED EMBODIMENTS

Figure 1:
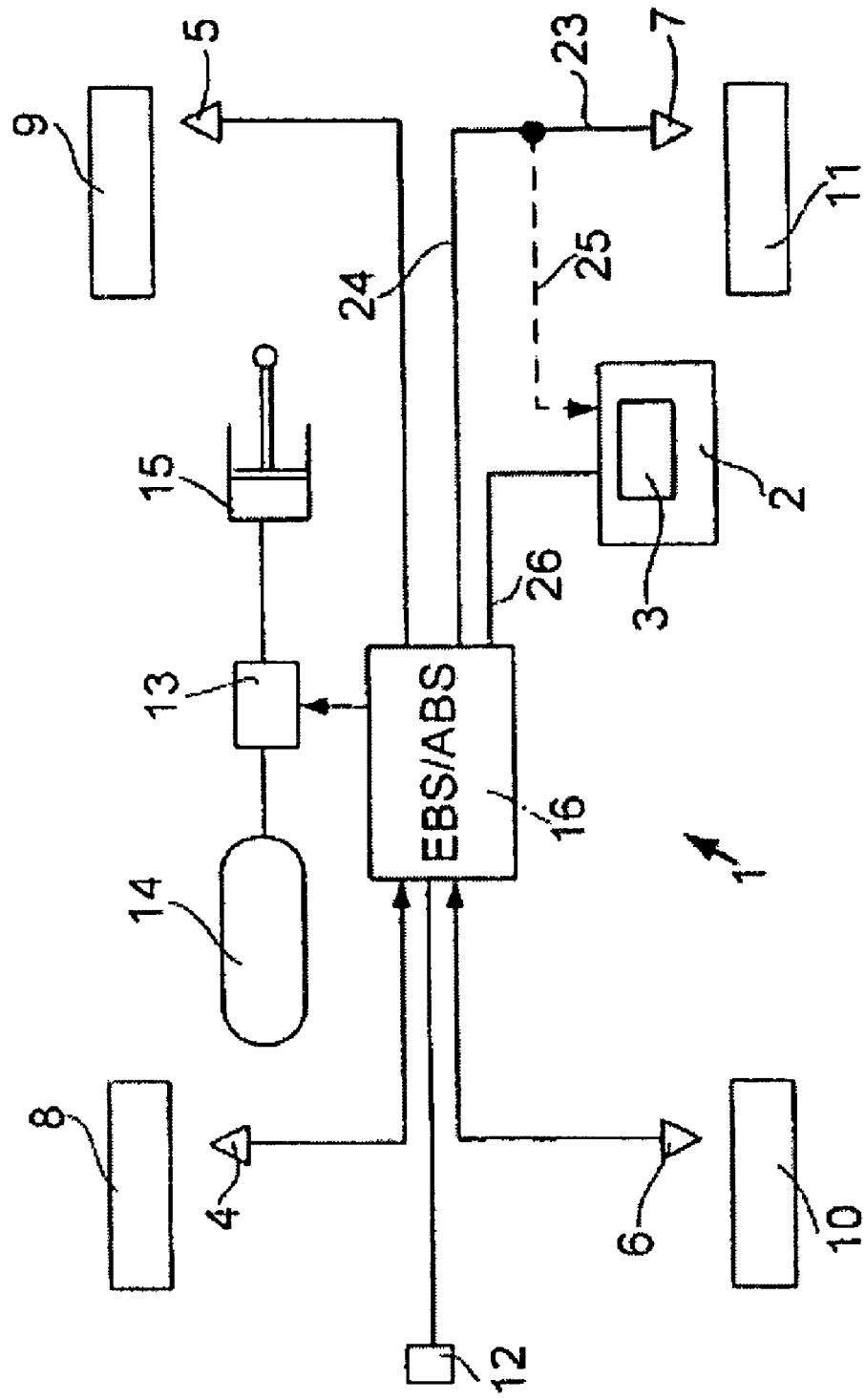
FIG. 1 is a schematic diagram of a pneumatic brake system with EBS/ABS for a trailer vehicle in accordance with an embodiment of the present invention.

Referring now to the drawing figures, in FIG. 1, the trailer vehicle is denoted by reference number (1). It has wheels (8, 10) on the front axle (VA) as well as wheels (9, 11) on the rear axle (HA). The wheel speeds are sensed in known manner by means of wheel sensors (4-7). These transmit the respective speed information to an EBS and/or to an ABS (16). From the received wheel-speed signals, the EBS/ABS calculates control signals in a known way and supplies them to one or more solenoid control valves (13). These can regulate the compressed-air supply from a reservoir tank (14) to wheel brakes (15). In this way, if wheels (8-11) skid during a braking process, the brake cylinders thereof are depressurized in known manner, thus allowing the wheels to start turning once again. Such an EBS/ABS is known, for example, from EP 966377 B1.

The EBS/ABS is further provided with a connecting socket (12), which, when trailer (1) is coupled to a tractor (not illustrated), can be connected to corresponding electronics in the tractor. Via connecting socket (12), data and the operating condition of trailer (1) can be communicated to the tractor. In the opposite direction, the tractor can communicate instructions to the trailer, for example for brake control or for lighting. Furthermore, an operating voltage can also be passed via socket (12) to the trailer.

A display unit (2), which has a display (3) is also connected to the EBS/ABS of trailer (1). Operating conditions of trailer (1), especially the mileage thereof, can be called up on this display. For this purpose display unit (2) needs information about the distance that trailer (1) has traveled. Conventionally, such information is communicated to display unit (2) via a branch (25) (shown as a dashed line) of a Y cable (23, 24, 25). By virtue of the present invention, however, branch (25) can be eliminated.

Figure 2:
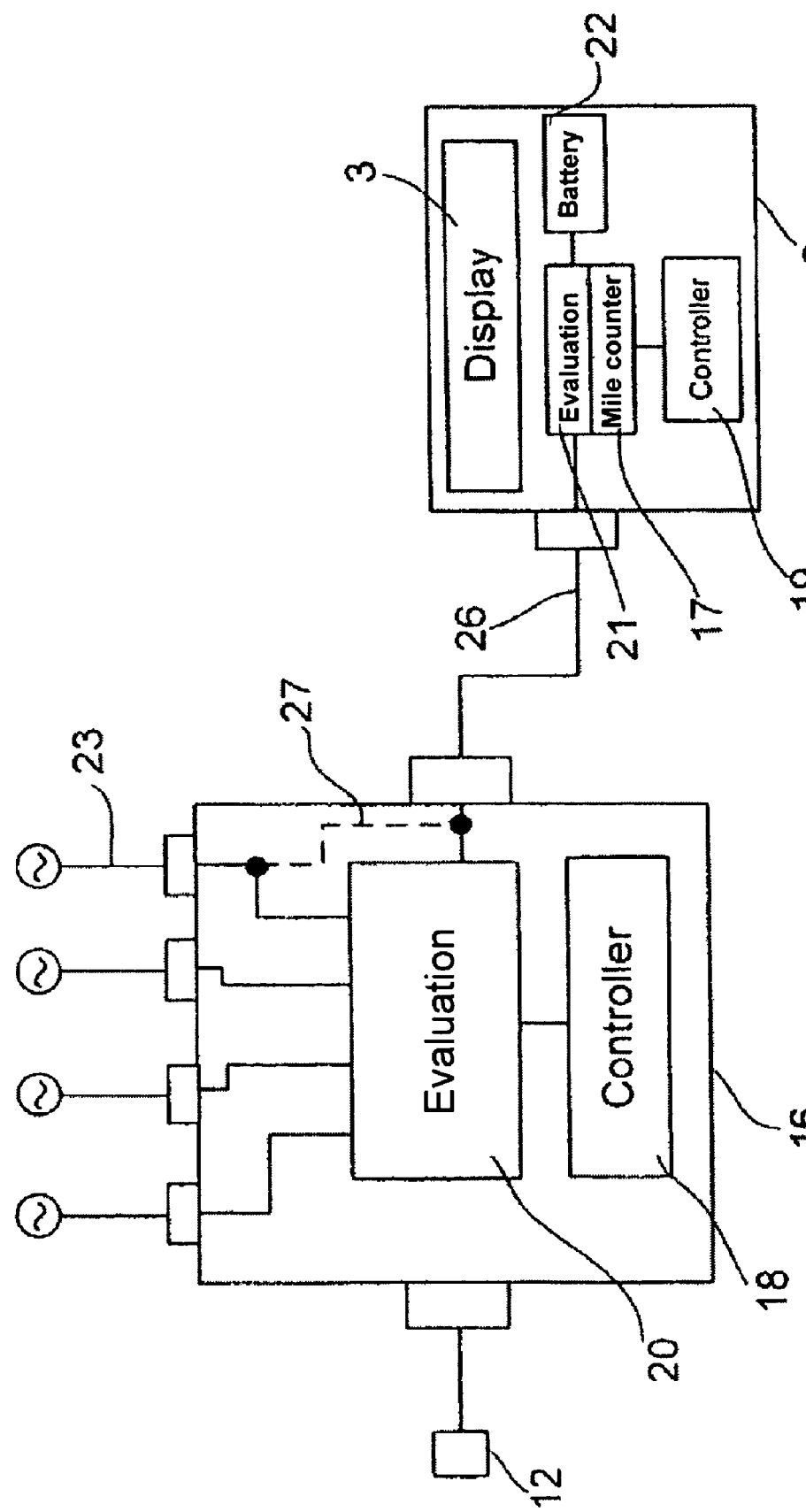
FIG. 2 is a schematic diagram of the EBS/ABS with connected display unit depicted in FIG. 1.

EBS/ABS (16) of FIG. 1, together with connected display (2), is illustrated in more detail in FIG. 2. As already described, EBS/ABS (16) can be connected to the truck via a connecting socket (12). Wheel-speed sensors (4-7) are also connected, as is normal practice. Display unit (2) is connected via a further connecting line (26). All connecting cables or connecting lines can be of multi-conductor type, and, in some cases, can be designed as a CAN data bus. The cables are connected via plug-in sockets (not illustrated) to EBS/ABS (16) and display unit (2), respectively.

The electronics of EBS/ABS (16) include an evaluating circuit (20), to which the wheel sensors (4-7) and a microcontroller (18) are connected. EBS/ABS (16) is of conventional design, and therefore need not be described in more detail.

Evaluating circuit (20) of EBS/ABS (16) is connected via a line (26) to an evaluating circuit (21) of display unit (2). Evaluating circuit (21) includes a mile counter (17). This includes simple logical counters, which count the pulses of the wheel sensors even when EBS/ABS (16) and display unit (2) are not being supplied with operating voltage from the truck. This is the case, for example, when the truck does not have an EBS/ABS or when socket (12) is not plugged in. In this case, the electronics of evaluating circuit (21) of display unit (2) are supplied by a built-in battery (22). Evaluating circuit (21) is further connected to a microcontroller (19) and to a display (3). Among other information, the mileage of trailer (1) can be shown on the display.

In contrast to conventional systems, display unit (2) according to embodiments of the present invention does not have a separate connection (25) to a wheel sensor (4-7). Instead, the wheel-speed signal is received firstly by EBS/ABS (16) and then relayed to display unit (2). For this purpose, the speed signal of one wheel sensor (7) is looped via its connecting line (23) through EBS/ABS (16) and relayed via line (26) to display unit (2). The speed signal of wheel sensor (7) can, optionally, be routed via evaluating circuit (20) or directly via a separate line (27) (illustrated as a dashed line). In each case, however, it is ensured that the speed signal is looped through the EBS/ABS electronics even in the absence of operating voltage of EBS/ABS (16).

The electronics of display unit (2) are advantageously designed such that, in standalone mile-counting operation of display unit (2), when only miles are being counted, microcontroller (19) thereof is not in operation. In this way a power savings is achieved, as power would have to be supplied either via line (26) from the truck or, if trailer EBS/ABS (16) were not in operation, as discussed above, via built-in battery (22). This means that, during the standalone operation, only evaluating circuit (21) with mile counter (17), but not microcomputer (19), is being supplied by built-in battery (22). As a result, the useful life of this battery is prolonged. The mileage can be called up on display unit (2) by pressing a key (not illustrated), whereupon the mileage of the trailer is shown on display (3).

Trailer mileage is also recorded internally by EBS/ABS (16) of the trailer. However, this recording process is active only as long as EBS/ABS (16) is supplied with operating voltage. The mileage recorded by EBS/ABS (16) can be shown both on a display in the truck (not illustrated) and on display unit (2) on the trailer. By comparing the two mileage displays of EBS/ABS (16) and of display unit (2), it is possible to determine how far trailer (1) has been driven with EBS/ABS (16) turned off.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A display system for a trailer vehicle, said trailer vehicle including wheels, wheel sensors for recording wheel speeds of said wheels, and at least one of an electronic brake system and an anti-lock brake system, said display system comprising a display unit including a display for displaying at least the mileage of said trailer vehicle, and a signal pathway from at least one of said wheel sensors to said at least one of said electronic brake system and said anti-lock brake system and to said display unit for passing a speed signal of said at least one of said wheel sensors through said at least one of said electronic brake system and said anti-lock brake system for relay to said display unit even in the absence of an operating voltage of said at least one of said electronic brake system and said anti-lock brake system, said signal pathway not including a separate connection between said at least one of said wheel sensors and said display unit.

2. The display system according to claim 1, wherein said display unit includes a mile counter and a battery, said mile counter including logical counters that are powered by said battery when said at least one of said electronic brake system and said anti-lock brake system and said display unit are not supplied with an operating voltage from another source.

3. The display system according to claim 1, wherein said display unit includes a processor that is inactive in a standalone mile-counting operation of said display unit.

* * * * *